(12) United States Patent
Allpress et al.

(10) Patent No.: US 6,744,778 B1
(45) Date of Patent: Jun. 1, 2004

(54) TIME DIVISION MULTIPLE ACCESS COMMUNICATION SYSTEM

(75) Inventors: Stephen Alan Allpress, Hoboken, NJ (US); Qiang Cao, Abbey Meads (GB); Lorenz Fred Freiberg, Grange Park (GB); Jie Lin, Swindon (GB); Steven Andrew Wood, Rownham Mead (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/262,531

(22) Filed: Mar. 4, 1999

(30) Foreign Application Priority Data

Mar. 6, 1998 (GB) .............................................. 9804891
Apr. 28, 1998 (EP) ............................................ 98303327

(51) Int. Cl.[7] .............................................. H04B 7/212
(52) U.S. Cl. ...................................... 370/442; 370/321
(58) Field of Search .................................. 370/280, 294, 370/314, 321, 326, 336, 347, 442, 329, 337, 439, 440, 450, 459

(56) References Cited

U.S. PATENT DOCUMENTS

| 4,809,268 A | 2/1989 | Tejima et al. |
| 4,995,034 A | 2/1991 | Lubcke et al. |
| 5,420,864 A | 5/1995 | Dahlin et al. ............... 370/95.3 |
| 5,535,207 A | * | 7/1996 | Dupont ........................ 370/80 |
| 5,729,541 A | * | 3/1998 | Hamalainen et al. ....... 370/337 |

FOREIGN PATENT DOCUMENTS

| EP | 0681406 A1 | 5/1995 | ............ H04Q/7/24 |
| EP | 0731571 A2 | 9/1996 | ............ H04B/7/26 |
| GB | 2252887 A | 8/1992 | ............ H04J/3/16 |
| GB | 2295525 A | 5/1996 | ............ H04J/3/16 |
| JP | 8307337 | 11/1996 | ............ H04B/7/26 |
| WO | WO 97/25785 | 7/1997 | ............ H04B/7/155 |
| WO | WO97/32413 | 9/1997 | ............ H04J/13/02 |
| WO | WO97/49200 | 12/1997 | ............ H04B/7/212 |

* cited by examiner

*Primary Examiner*—Wellington Chin
*Assistant Examiner*—Brenda Pham

(57) ABSTRACT

A time division multiple access communication system is disclosed, in which down link data are transmitted over a data channel in repeated time frames each containing a plurality of time slots. Down link set up information is transmitted over a control channel to indicate from which time slot a user terminal should extract data. Each frame on the data channel includes a user packet flag to indicate whether or not each time slot in the frame contains data. Each user terminal is responsive to the set up information and to the user packet flags to extract data from its assigned time slot in those frames which the slot is indicated to contain data.

4 Claims, 3 Drawing Sheets

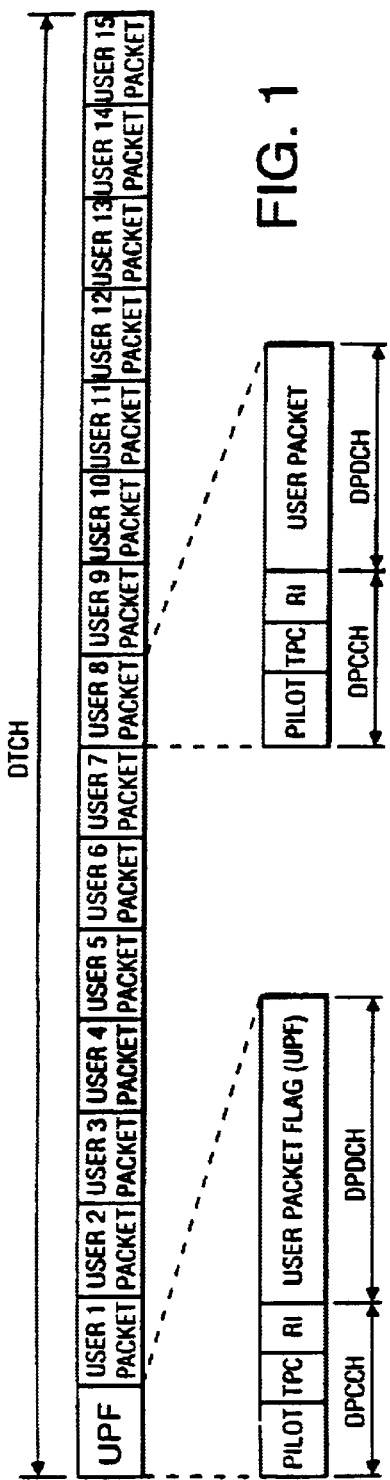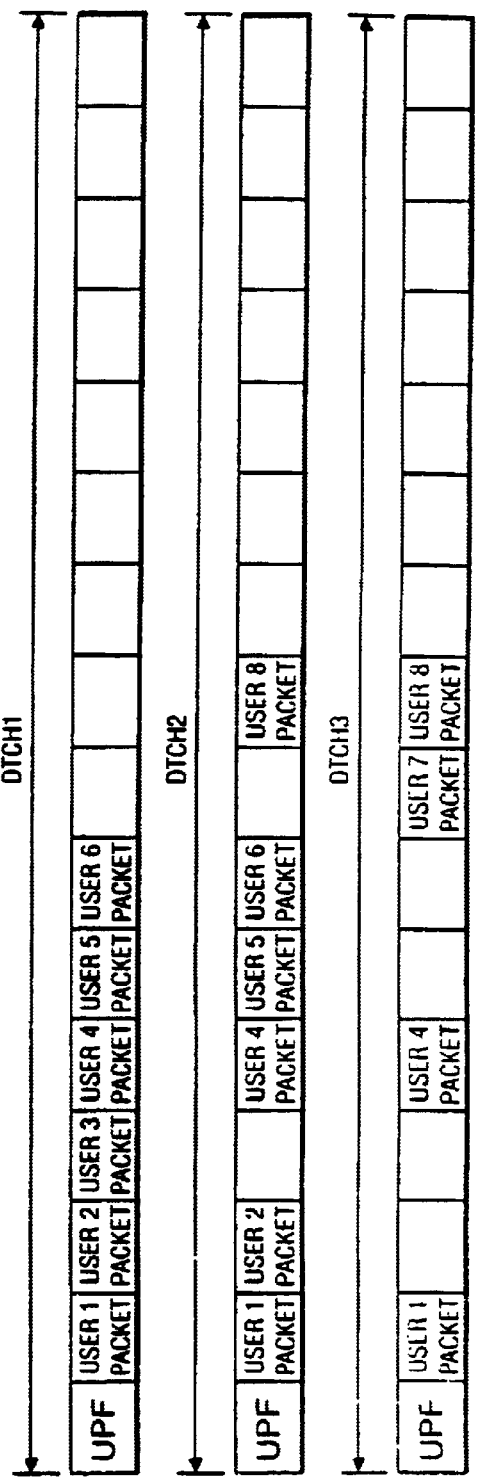

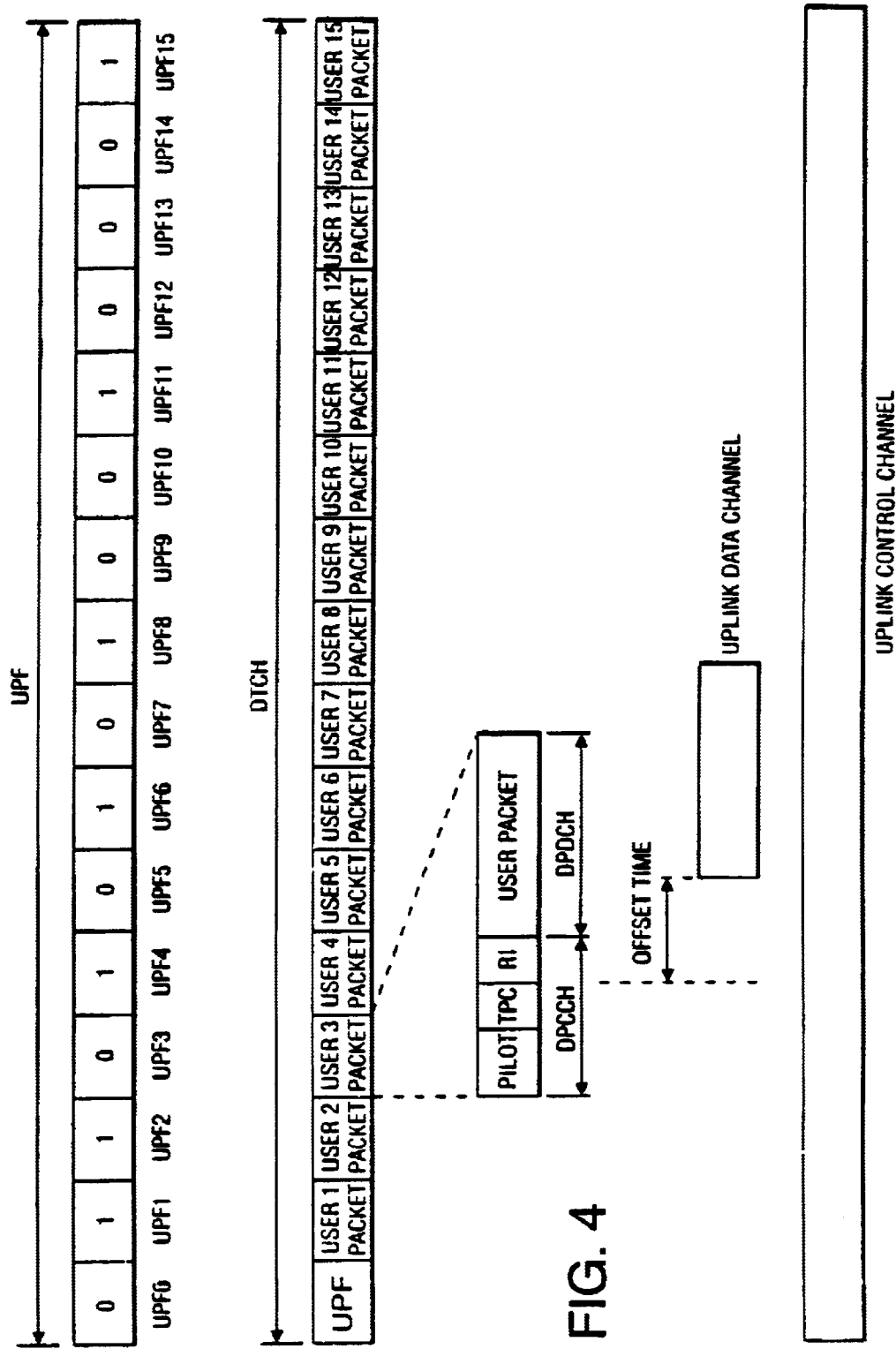

TIME DIVISION MULTIPLE ACCESS COMMUNICATION SYSTEM

CROSS-REFERENCED TO RELATED APPLICATION

This application claims priority of Great Britain Patent Application No. 5 9804891.1, which was filed on Mar. 6, 1998, and also European Patent Application No. 98303327.5, which was filed on Apr. 28, 1998.

FIELD OF THE INVENTION

This invention relates to time division multiple access communication systems.

BACKGROUND OF THE RELATED ART

Traditionally, user traffic in a code division multiple access system is circuit switched. Once a call has been set up, the connection is maintained throughout the duration of the service request. A dedicated traffic channel is assigned to each active user for both the uplink and the downlink. Each dedicated traffic channel is characterized by a unique spreading code. Throughout the entire session, the dedicated traffic channel is used exclusively by the active user.

The circuit switched method is robust, and result in high system capacity by supporting: macro-diversity (soft handover); power control; limited random access overhead.

However, in wideband multi-service code division multiple access systems, extremely burst traffic needs to be supported. Burst traffic is supported by adjusting the data rate, and hence the spreading factor and spreading code. However, the need to quickly adjust the spreading code leads to highly complex code allocation algorithms.

Another popular method for accommodating bursty services is through packet switched data. ETSI UMTS W-CDMA (European Telecommunications Standards Institute Universal Mobile Telecommunications Service Wide Band code Division Multiple Access) and ARIB W-CDMA (Association of Radio Industry Business Wide Band Code Division Multiple Access) propose to use RACH/FACH (Random Access Channel/Forward Access Channel) to transmit infrequent bursty packet data. The advantage of such a scheme is quick set up time. A dedicated traffic channel is not required.

However, this transmission mechanism uses open loop power control only, and macro-diversity is not supported.

SUMMARY OF THE INVENTION

Against this background, in accordance with the invention, there is provided a time division multiple access communication system, in which down link data are transmitted over a data channel in repeated time frames each containing a plurality of time slots, and down link set up information is transmitted over a control channel to indicate from which time slot a user terminal should extract data, each frame on the data channel including a user packet flag to indicate whether or not each time slot in the frame contains data, and each user terminal being responsive to the set up information and to the user packet flags to extract data from its assigned time slot in those frames which the slot is indicated to contain data.

A plurality of bursty packet data users may be multiplexed onto the same downlink dedicated traffic channel. The multiplexing scheme allows low complexity code allocation; macro-diversity and soft handover; low associated control overhead; and limited closed loop power control.

BRIEF DESCRIPTION OF THE DRAWINGS

One embodiment of the invention will now be described, by way of example, with reference to the accompanying drawing, in which:

FIG. 1 is a schematic representation of a down link time frame on a dedicated transmission channel in a communication system embodying the invention;

FIG. 2 is a schematic representation of a plurality of down link time frames in the system of FIG. 1;

FIG. 3 is a schematic representation of a user packet flag in a frame on the down link in the system of FIG. 1;

FIG. 4 is a schematic representation of an uplink data channel and the uplink control channel in relation to the down link time frame of FIG. 1.

DETAILED DESCRIPTION

Figure 5:
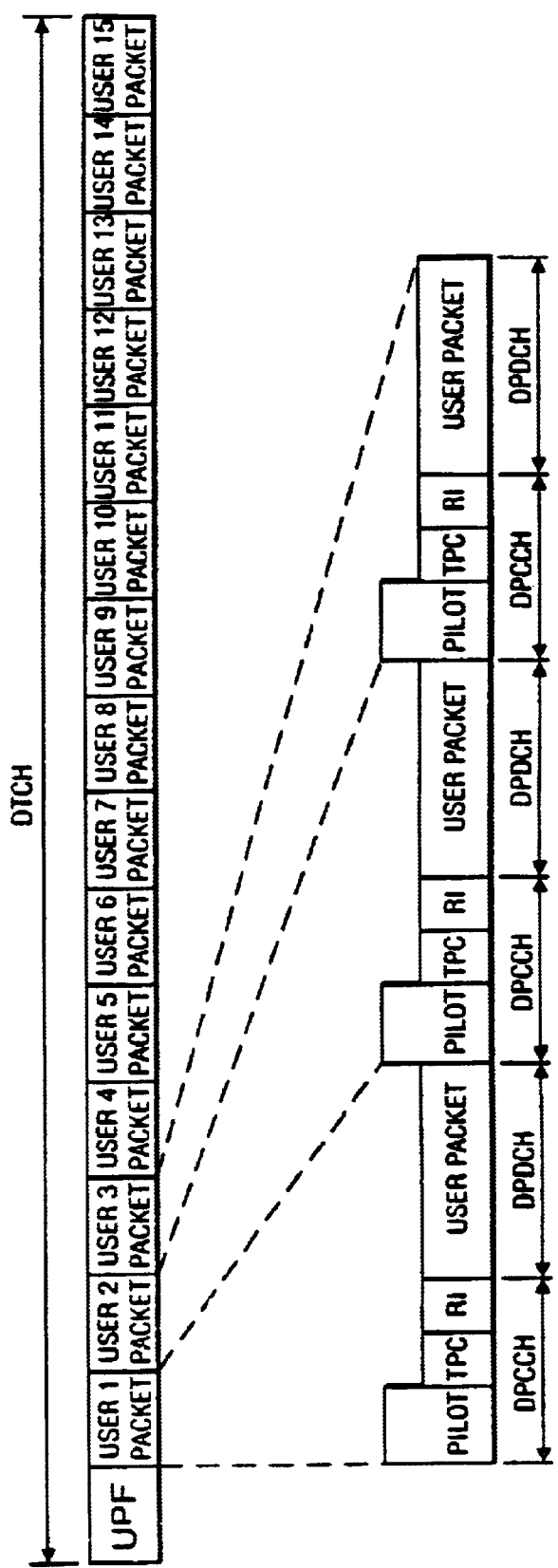
FIG. 5 shows power levels on the down link.

In an initialization stage, user-terminals, e.g. mobile stations, acquire slot and frame synchronization. Mobile stations also perform codegroup identification and scrambling-code identification. After the scrambling code has been identified, the primary CCPCH (Comon Control Physical Channel) can be detected, the system and cell specific BCCH (Broadcast Communication Channel) information can be read. RACH will be known to the mobile stations.

For mobile station initiated bursty packet data transmission, mobile stations perform a random access request procedure. Based on the successful reception of the random access request from a mobile station, a base station informs the mobile station on which dedicated transmission channel packet data is to be transmitted. For base station initiated bursty packet data transmission, the base station simply pages the user(s) and indicates the dedicated transmission channel on which packet data is to be transmitted. The mobile station acknowledges setting up the dedicated transmission channel. In both cases, mobile stations are informed by the base station which time slot in the dedicated transmission channel frame they take packets from. In other words, the mobile station knows the location of the slot in the dedicated transmission channel time frame to receive packets if there are any.

The downlink dedicated transmission channel is organized as shown in FIG. 1. A dedicated transmission channel time frame consists of 16 time slots. The first slot is used to transmit a user packet flag indicating the location of a packet which is addressed to a specific user. The rest of the slots in the frame will be used to transmit data user packets to the users.

Control information (pilot, transmission power control, and rate information) is transmitted on dedicated physical control channel and data information is transmitted on dedicated physical data channel. The control channel and data channel are time multiplexed as shown in FIG. 1. The dedicated physical data channel carries user packets and user packet flag information.

A common situation in the dedicated transmission channel is that not all frame slots are filled up by user packets. This is shown in FIG. 2 where three successive frames are shown.

To multiplex bursty packet data users onto a single physical dedicated traffic channel a simplified orthogonal spreading code allocation is utilized while maintaining most of the benefits of virtual circuit transmission.

The user packet flag (UPF) is composed of 15 fields, corresponding to at most 15 slots for user packets in a frame

UPF=[UPF1, UPF2, UPF3 . . . , UPF15]

Each field of the user packet field UPF indicates the status of a corresponding slot (whether there is a packet for the specific user or not)

$$status = \begin{cases} 0 \text{ no packet} \\ 1 \text{ a packet} \end{cases}$$

The user packet flag UPF is merely a bit sequence of length L. Typically, L is equal to 15+1 (including first bit=0 permanently), since in the embodiment at most 15 users are assigned to receive bursty packet data from the dedicated transmission channel. As soon as mobile stations receive the user packet flag UPF they will be able to identify if there is any packet for them contained in the frame. If there is, they extract the relevant packets. An example of a user packet flag UPF is shown in FIG. 3. This UPF pattern (UPF-6A9 1 H) indicates that there are packets in the frame for the users presently associated with the time slots identified by:

User1, User2, User4, User6, User8, User11, and User15 and that there are no packets in the frame for the users presently associated with the time slots identified by:

User3 , User5, User7, User9 User10, User12, User13 and User14

The flag for time slot zero UPF0 is always set as 0. The user packet flag UPF contains important information. To make it more robust, repetition can be used to obtain diversity gain, e.g. each bit may be repeated at least once.

Control information (Pilot, TPC [Transmission Power Control], and RI [Rate Information]) is transmitted in every slot on the dedicated transmission channel DTCH (Dedicated Traffic Channel), even when there is no user data. Therefore, soft handover, as well as limited closed loop power control, still retains.

Since downlink bursty traffic transmission is removed to a dedicated transmission channel DTCH rather than FACH, traffic on RACH/FACH loop decreases. Consequently, probability for random access increases, resulting in a decrease of blocking rate.

The uplink transmission is not time multiplexed; each user is assigned a unique spreading code, as shown in FIG. 4. Since the control channel is transmitted continuously for each user in the uplink, the base station is able to monitor the received power continuously. However, the BTS (base tranceiver station) is limited in the number of power control symbols it is able to send each user. In fact, the BTS only transmits a TPC symbol relevant to an individual user, during the slot assigned to that user. Consequently, the user may receive as few as one TPC symbol per frame. The uplink power control is limited, not in the quality of the information, but in how often the information can be transmitted. Hence, to maximize the effectiveness of the uplink power control, and to limit intra-cell interference, the uplink data should be transmitted as soon as possible after receiving the TPC symbol for the multiplexed downlink channel. The offset time, as displayed in FIG. 4, should be kept to minimum. Fortunately, it is expected that there will be a high degree of asymmetry in W-CDMA bearer services. The amount of uplink data will be very small in relation to the downlink data. Therefore, the uplink data can be concentrated in time, and sent shortly after receiving the TPC symbol.

The uplink power control scheme specified in UMTS limits the BTS to one symbol during the slot assigned to that user on the down link. Since mobile stations would receive their power control symbol intermittently, e.g. one per frame, due to the bursty nature of the downlink transmission, the rate of adjustment may not be sufficient to keep up with changing uplink power requirements. In order to improve the position, a further piggy back symbol is used to transmit power adjustment information in each slot on the downlink, so that the power adjustment required is transmitted in two symbols.

In each time slot, the data is destined to a particular user only. However, the pilot symbols are used by all users. Therefore, the downlink transmit power of the pilot symbols must be constant and high enough for all users to properly receive. The data portion may be adjusted for each user. Each user's continuous uplink control channel contains all downlink power control symbols defined for a dedicated traffic channel. Hence the downlink can adjust the power level of user data properly as shown in FIG. 5.

What is claimed is:

1. A time division multiple access communication system comprising:

a base station for transmitting down link data over a data channel in repeated time frames each containing a plurality of user time slots, and for transmitting down link set up information over a control channel to indicate from which user time slot a user terminal should extract data, wherein each frame on the data channel includes a user packet flag in a distinct time slot to indicate whether or not each user time slot in the frame contains data, the user packet flag includes a plurality of fields each associated with a respective one of said plurality of user time slots, the value in each field being indicative of whether the respective user time slot contains data, and the set up information and to the user packet flags indicative to a user terminal to extract data from its assigned time slot in those frames which the slot is indicated to contain data.

2. The time division multiple access communication system of claim 1, in which the user packet flag is transmitted first in each time frame.

3. A method for transmitting data over a data channel having repeated time frames, wherein each of the time frames have a plurality of time slots, the method comprising the steps of:

transmitting set up information over a control channel to indicate over which of the plurality of time slots will have data transmitted; and transmitting data in the plurality of time slots indicated by the set up information, wherein the control channel is a time slot in each of the time frames, the set up information comprises a user packet flag having fields for indicating whether data will be transmitted over time slots corresponding to the fields, and the user packet flag includes a plurality of fields each associated with a respective one of said plurality of time slots, the value in each field being indicative of whether the respective time slot contains data.

4. A method for a user terminal receiving data over a data channel having repeated time frames, wherein each of the time frames have a plurality of time slots, the method comprising the steps of:

receiving set up information over a control channel, wherein the control channel is a time slot in each of the time frames; and extracting data from a time slot if the set up information indicates that the time slot contain data for the user terminal, wherein the set up information comprises a user packet flag having fields for indicating whether data will be transmitted over time slots corresponding to the fields, and the user packet flag includes a plurality of fields each associated with a respective one of said plurality of user time slots, the value in each field being indicative of whether the respective user time slot contains data.

\* \* \* \* \*